(12) United States Patent  (10) Patent No.: US 6,954,451 B1
Jurasek et al.  (45) Date of Patent: Oct. 11, 2005

(54) DISTRIBUTED TIME-MULTIPLEXED BUS ARCHITECTURE AND EMULATION APPARATUS

(75) Inventors: David Jurasek, Banks, OR (US); Edward Evans, Long Beach, OR (US)

(73) Assignee: RaveSim, Inc., Portland, OR (US)

( * ) Notice: Subject to any disclaimer, the term of this patent is extended or adjusted under 35 U.S.C. 154(b) by 988 days.

(21) Appl. No.: 09/718,569

(22) Filed: Nov. 21, 2000

(51) Int. Cl.$^7$ .................. H04B 7/212; H03K 19/20
(52) U.S. Cl. .................. 370/347; 370/537; 326/114; 327/407
(58) Field of Search .................. 326/114; 327/407; 370/321, 347, 537, 540

(56) References Cited

U.S. PATENT DOCUMENTS

| | | | | |
|---|---|---|---|---|
| 3,741,347 A | * | 6/1973 | Kirsch | 187/389 |
| 4,044,336 A | * | 8/1977 | Babb | 707/3 |
| 4,355,386 A | * | 10/1982 | Binz et al. | 370/217 |
| 4,507,792 A | * | 3/1985 | Yamakido et al. | 375/249 |
| 5,051,989 A | * | 9/1991 | Negishi | 370/347 |
| 5,371,741 A | * | 12/1994 | Entani | 370/537 |
| 5,425,022 A | | 6/1995 | Clark et al. | |
| 5,596,742 A | | 1/1997 | Agarwal et al. | |
| 5,789,966 A | | 8/1998 | Béchade | |
| 6,708,248 B1 | * | 3/2004 | Garrett et al. | 711/104 |

* cited by examiner

*Primary Examiner*—Chi Pham
*Assistant Examiner*—Keith M. George
(74) *Attorney, Agent, or Firm*—King & Spalding LLP

(57) ABSTRACT

A time-multiplexed data bus driver circuit includes a plurality of combinatorial circuits, each of the circuits forming a logic combination of a datum value, a datum enable signal and a datum timeslot signal, the plurality of circuits producing a plurality of output signals based thereon, and a wired-OR junction producing a logic OR combination of the plurality of output signals representing a time-multiplexed data stream. Preferably, for each of the combinatorial circuits the enable signal, the timeslot signal and the datum signal (and preferably also a clock signal) are combined in an AND function to produce a gating signal for an active-low datum value, one selected active-low datum value being gated onto the wired-OR junction at a given timeslot when enabled. The common time-multiplexed data channel at the wired-OR junction has a pre-charge circuit for biasing the junction to a positive or ground voltage, thereby representing in an un-driven state a respective logic 1 or 0.

24 Claims, 2 Drawing Sheets

DISTRIBUTED TIME-MULTIPLEXED BUS ARCHITECTURE AND EMULATION APPARATUS

BACKGROUND OF THE INVENTION

The present invention concerns distributed time-multiplexed bus architecture and emulation apparatus, and more particularly to a time-multiplexed bus circuit and system that greatly reduces propagation delay in emulation or prototyping systems.

Electronics systems generally involve the connection of two or more system components together via a high speed data channel. In order to save on system costs the number of data channels or data buses is usually kept to a minimum. The same data channel is often used to transfer data between multiple system components in either direction and may also be used to transfer data from one component to several other components in a broadcast mode. In order to optimize the overall system performance it is necessary to minimize the amount of time that the data channel is idle between data transfers and to maximize the rate at which data can be transferred.

In a typical system, there is an arbitration logic block that determines which system block is allowed to initiate a data transfer at any given time. This prevents two different system components from transferring data at the same time on the same data channel and thus corrupting each other's data. Typically a system component will request the use of the data channel from the arbitration unit and when the data channel is free that component will be granted the use of the data channel. The system component can then start transferring data on the data channel. There is generally a delay between when the system component is granted the use of the data channel and when it is capable of starting an actual data transfer because the system component must recognized the grant signal and then enable its data buffers to the data bus. In a synchronous system, this delay is at a minimum one clock period but can be longer. This leaves the data channel unused for some period of time and consequently degrades the overall system performance.

IBM in its distributed multiplexer (see patent cited below) breaks the data channel interface into two pieces. One piece is a data node local to each system component that is used to set up the data that is to be transferred on the data channel the clock period prior to data actual being driven on the data channel. The other piece is a multiplexer component that connects to the data channel. This is done to minimize the time delay to actually make the transfer, since only the time delay of the multiplexer component is involved (not the setup and delay of the local data node portion of the circuitry). In this scheme, each system component multiplexer has a data input bus and a data output bus. The data output bus is a logic OR of the component's internal data from the local data node piece and the input data bus of the multiplexer portion of the circuitry. There is then a system level bus grant signal that comes from the arbitration logic that is used to enable the internal data into the logic OR. Throughout the system the output data bus of one component is connected to the input bus of the next component in a daisy-chain fashion. The arbitration logic is responsible for enabling only one system component at a time. The result is that the data bus always contains the data driven from the enabled component without any clock delays needed for a system component to decode a grant signal and then sequentially enable data bus buffers.

Such a distributed multiplexing scheme is slow when used in a system where the data bus is a time-multiplexed bus. This is true because in a time-multiplexed system it takes one timeslot or clock cycle to transfer data through each system component's logic OR. Thus for a system with five components in the bus chain, it would take five timeslots to transfer the correct data throughout the data channel. The current invention reduces the number of timeslots necessary to get the correct data on the data bus to one.

Wired-OR buses are commonly used in computer systems today, as are distributed multiplexers, and both have been used in emulation systems. See, for example, U.S. Pat. No. 5,425,022 assigned to British Telecom entitled DATA SWITCHING NODES; U.S. Pat. No. 5,789,966 assigned to IBM entitled DISTRIBUTED MULTIPLEXER; and U.S. Pat. No. 5,596,742 assigned to MIT entitled VIRTUAL INTERCONNECTIONS FOR RECONFIGURABLE LOGIC SYSTEMS.

SUMMARY OF THE INVENTION

A time-multiplexed data bus driver circuit includes a plurality of combinatorial circuits, each of the circuits forming a logic combination of a datum value, a datum enable signal and a datum timeslot signal, the plurality of circuits producing a plurality of output signals based thereon, and a wired-OR junction producing a logic OR combination of the plurality of output signals representing a time-multiplexed data stream. Preferably, for each of the combinatorial circuits the enable signal and the timeslot signal are combined in an AND function to produce a gating signal for the datum value, one selected datum value being gated onto the wired-OR junction, at a given timeslot, when enabled. The common time-multiplexed data channel at the wired-OR junction has a pull-up device connected to a bias voltage or a pull-down device connected to a ground voltage, thereby representing in an un-driven state a respective logic 1 or 0.

The foregoing and other objects, features and advantages of the invention will become more readily apparent from the following detailed description of a preferred embodiment that proceeds with reference to the drawings.

DETAILED DESCRIPTION OF THE PREFERRED EMBODIMENT

In the current invention, a common time-multiplexed bus is used to connect all system components. However, instead of using one timeslot to transfer data just between two nodes, the resultant data from all nodes is transferred in a single timeslot. To do this, all nodes are enabled at the same timeslot. The previous timeslot is used to transfer the value of the grant signal to all nodes. Then during the enabled timeslot the node that is granted the bus will drive data onto the bus and all other nodes will float the bus. This allows the transfer to be done within one timeslot.

Figure 1:
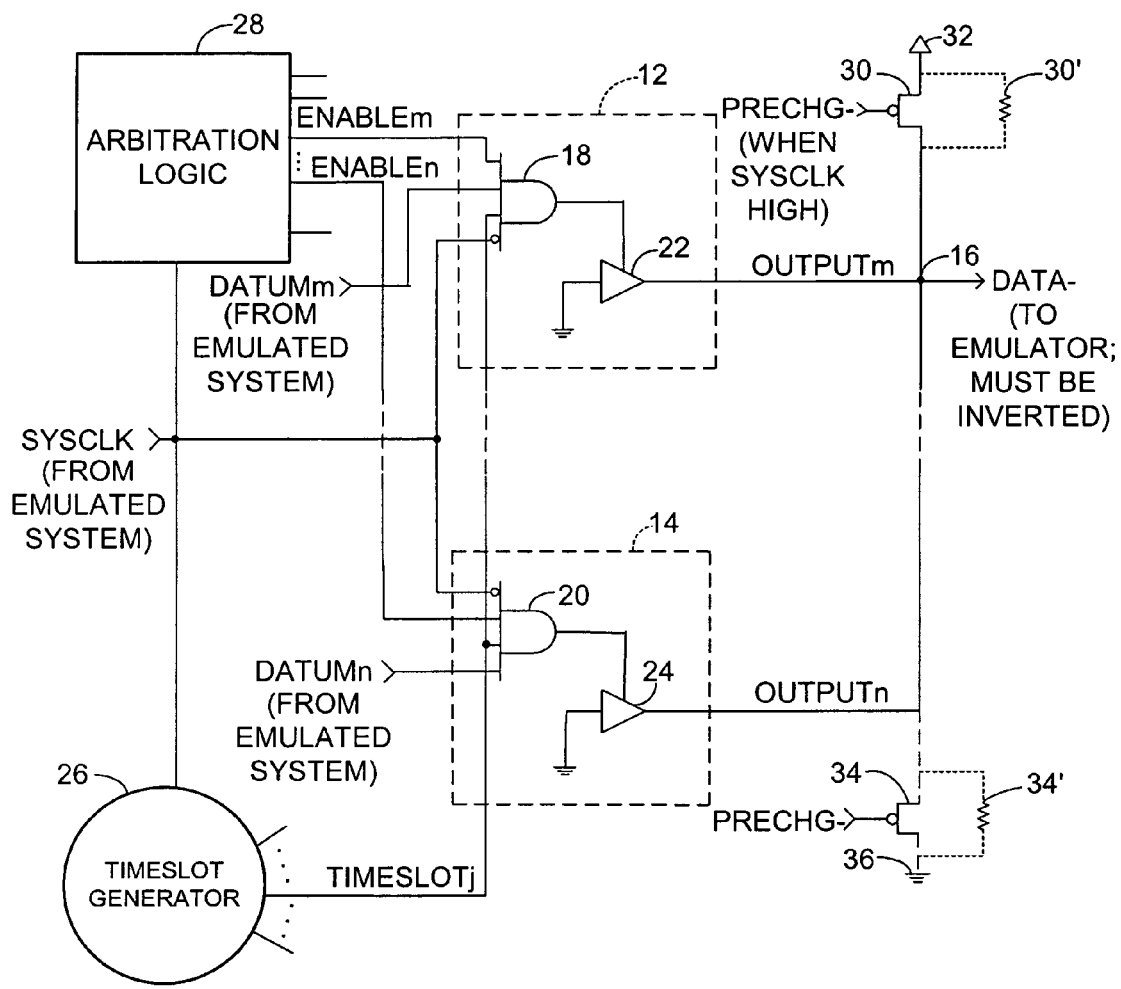
FIG. 1 is a simplified schematic diagram of the distributed time-multiplexed bus architecture in accordance with a preferred embodiment of the invention.

FIG. 1 illustrates the apparatus in accordance with a preferred embodiment at 10. Apparatus 10 includes plural instances of identical combinatorial circuits of which two are indicated at 12 and 14 within dashed outlines. Each combinatorial circuit may be seen to form a logic combination of a DATUM value, a datum ENABLE or gate signal and a datum TIMESLOT signal. The plurality of circuits such as circuits 12 and 14 may be understood to produce a plurality of output signals such as OUTPUTm and OUTPUTn based upon the value and timing of their inputs. A wired-OR junction indicated in FIG. 1 as node 16 will be understood to produce a logic OR combination of the plural high-active output signals. As will be seen, this logic combination of plural output signals represents a time-multiplexed data stream. Those of skill in the art will appreciate that, within the spirit and scope of the invention, typically there may be dozens, hundreds or even thousands or more such wired-OR output signals.

Those of skill in the art will appreciate that the term wired-OR is used most broadly herein to refer to a common junction of plural signals, whether representing high-active or low-active logic. Thus, in a high-active logic system, the junction produces a logic one at the output when any input to the common junction is high, effectively producing a logic OR of the inputs. Conversely, in a low-active logic system, the junction produces a logic zero at the output when any input to the common junction is low, effectively producing a logic AND of the inputs. By changing the high-positive (logic 1=true) or low-positive (logic 0=true) logic of the drive gates and data nodes, it will be understood that the wired-OR junction described and illustrated herein can function to produce either a logic AND or a logic OR function, based upon well-known logic conventions.

In each combinatorial circuit, the ENABLE signal, the TIMESLOT signal, the DATUM signal and the SYSCLK (low) signal are combined in an AND function represented by AND gates 18 and 20. For a given TIMESLOT, the gating signal to the tri-state buffer will be true only if the ENABLE and DATUM signals are true. If this is the case, the active-datum "0" on the input of the tri-state buffer will be gated onto the wired-OR junction 16. Since this junction has previously been precharged to a "1" by pre-charge transistor 30, it will stay high (which represents a "0" in active-low logic) if none of the tri-state buffers is enabled. However, if one or more of the tri-state buffers is enabled, then junction 16 will be driven to a low level (which represents a "1" in active-low logic), thus correctly performing the OR function of the distributed multiplexer. Since the data at junction 16 is active-low, the receiver of the data must reinvert that data to correctly reproduce the distributed multiplexer's output. Alternatively, junction 16 could be implemented in active-high logic, in which case the pre-charge would be to a low level and the input to the tri-state buffer would be a "1." In this case, no inverter is needed at the receiver.

A timeslot generator (or timeslot generation logic) 26 produces a plurality of TIMESLOT enable signals one of which, e.g. TIMESLOTj, preferably drives corresponding first inputs of AND gates 18 and 20. The other corresponding inputs to AND gates 18 and 20 are the ENABLE or grant outputs from arbitration logic 28, which selectively enables only one output at a time in accordance with a system-level determined priority allocation scheme, as is known.

Those of skill in the art will appreciate that the non-selected outputs are inactive and thus the corresponding AND gate's output is inactive and a corresponding tri-state buffer drives its output signal into a defined high-impedance state, thereby avoiding corruption of the selected datum value. In accordance with the preferred embodiments of the invention, only one selected datum value is gated onto wired-OR junction 16 at a given timeslot, when enabled. It may be seen from FIG. 1 that in accordance with the preferred embodiments of the invention, a plurality of timeslot enable signals input to a plurality of combinatorial circuits are connected in common, i.e. they are driven by a common output of timeslot generator 26. Thus, wired-OR junction 16 may be understood to be a single bit-wide, time-multiplexed data bus of channel.

In real life, an error in the design of the arbitration logic or timeslot generator would produce an error in the output data. Similarly, in a verification system, an error in the design of the arbitration logic or timeslot generator should produce an error in the output data. Thus it is important in such a simulation or emulation context that errors, e.g. an incorrect arbitration logic function, be dutifully reproduced so that the designer can make design corrections before the design is committed to silicon or other physical embodiments. Those of skill in the art will appreciate that one or more such single bit-wide, time-multiplexed data channels may form a part of an emulation system, as such are well known. Those of skill in the art will appreciate that in such a field of use of the present invention, data nodes selection mechanism 28, timeslot selection mechanism 26 and two or more switches such as switches 12 and 14 would form a part of the system being emulated. This is illustrated in FIG. 1 by various labels.

In accordance with a first preferred embodiment of the invention, wired-OR junction 16 includes a pull-up device 30, e.g. a resistor or transistor, connected to a bias voltage 32 such as VCC (typically +3.3V in a digital system). In accordance with a second preferred embodiment of the invention, wired-OR junction 16 includes a pull-down device 34, e.g. a resistor or transistor, connected to a ground voltage 36. Those of skill in the art will appreciate that pulling the data bus up or down places the un-driven bus in a defined logic state thus enabling a wired-OR function. (The bus otherwise would remain in a high-impedance state at a so-called "float" voltage that is susceptible of assuming either logic state, e.g. via signal cross-talk or ground noise).

As an alternative solution, each node multiplexer can contain an OR gate as in the IBM distributed multiplexing scheme except that instead of daisy-chaining the data bus between node multiplexers, the OR gate can use a tri-state driver to drive a common data bus. The data bus must be resistively pulled up during the timeslot or pre-charged prior to the timeslot in which the data transfer is enabled. Since only one node is enabled at a time, the correct value will be driven onto the data bus or channel.

Those of skill in the art will appreciate that pre-charging via an active transistor or other switching device is preferable, since it actively drives the un-driven bus to a known (high or low) voltage far more quickly (albeit a slowly decaying voltage) for operation of high-speed systems, thus ensuring a known logic state early in a given data cycle. This pre-charging is illustrated by way of transistors 30 and 34 in FIG. 1, whereas the less-preferred alternative pull-up or pull-down resistor approach is illustrated by way of phantom resistors 30' and 34'. It will be appreciated that typically only one of pre-charge transistor 30 and 34, gated by a negative-going precharge signal PRECHG-, as shown, (or alternatively only one of pull-up and pull-down resistors 30' and 34') is present, depending upon the desired high-active or low-active logic state.

Figure 2:
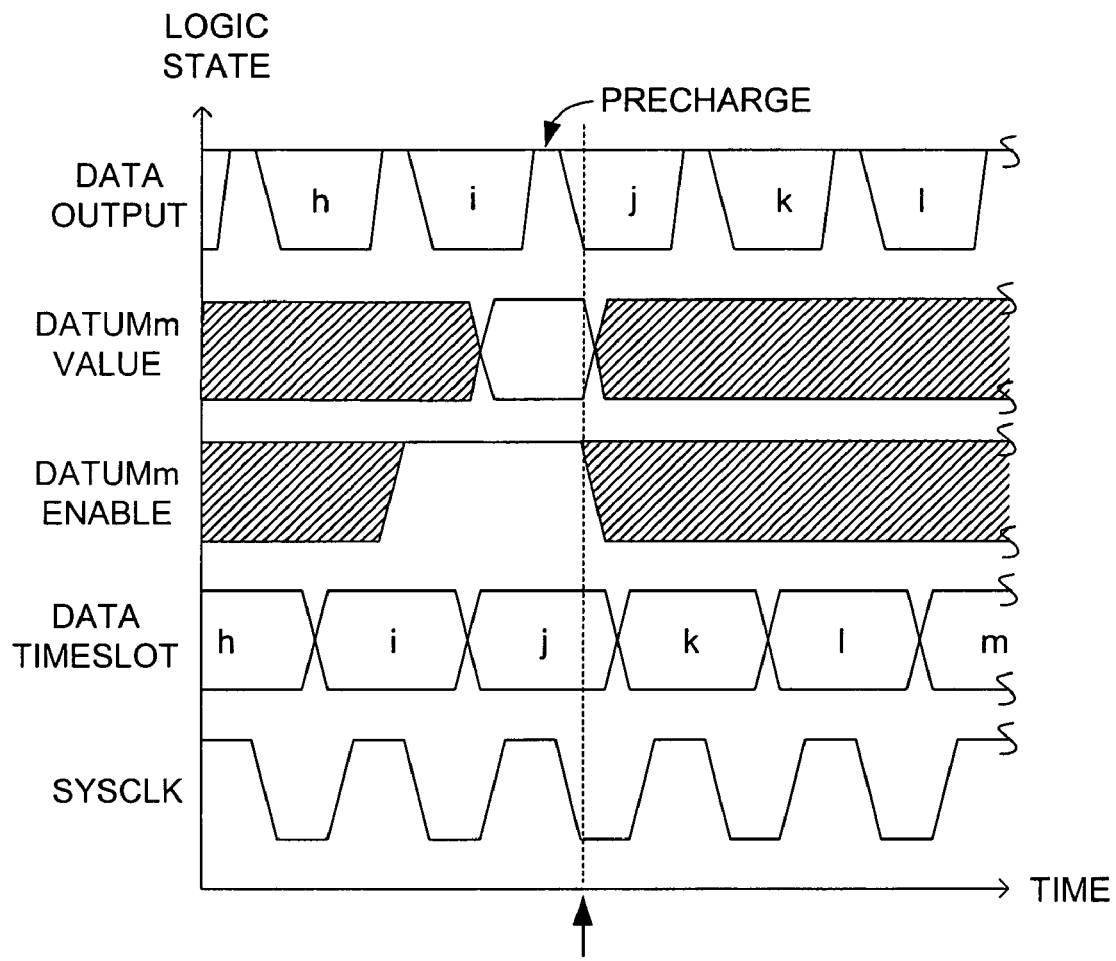
FIG. 2 is a timing diagram illustrating the datum, datum enable signal, datum timeslot signal and output data timing in accordance with a preferred embodiment of the invention.

Turning now to FIG. 2, the timing of the various signals of combinatorial circuits 18 and 20 will be described. Those of skill in the art will appreciate that the rise and fall times are exaggerated in FIG. 2 to better illustrate various sequencing and set-up requirements. The bottom trace in FIG. 2 is a SYSCLK waveform, a system clock that is provided by a system utilizing the invention for synchronization purposes. The next trace up is a DATA TIMESLOT waveform, with each bit of data being supplied in succession within timeslots h, i, j, k, l and m. Those of skill will appreciate that such successive timeslots are enabled, in accordance with the invention, by timeslot generator 26.

The next trace up in FIG. 2 is a DATUMm ENABLE waveform, wherein the enable signal corresponding with timeslot j of interest is asserted nearly a full timeslot earlier at timeslot i. This is so that sufficient setup time for the enable signal to be propagated to the input of AND gate 18 within combinatorial circuit 12, as described by reference to FIG. 1. Those of skill in the art will appreciate that the shading to either side of the enable signal waveform represents a don't care condition for DATUMm ENABLE. The next trace up is a DATUMm VALUE waveform, the datum input to buffer/driver 22 of combinatorial circuit 12. Again, the shading to either side represents a don't care condition for DATUMm VALUE.

Finally in FIG. 2, the top trace is a DATA OUTPUT waveform corresponding generally with wired-OR junction 16 and illustrating the succession of bits corresponding with timeslots h, i, j, k, 1 and m on the channel. A vertical dotted line in FIG. 2 indicated by an arrow represents the point in time of interest at which DATUMm is enabled onto the time-multiplexed bus during TIMESLOTj. The datum is enabled onto the bus on the falling edge of SYSCLK and is captured at the receiver on the next rising edge of SYSCLK (as suggested by the bubble SYSCLK input to AND gates 18 and 20 in FIG. 1). Those of skill in the art will appreciate that the PRECHARGE voltage segments in between the bits is to illustrate that buffer/drivers 22 and 24, are tri-state buffers/drivers and that the bus is pulled up to a logic 1 or down to a logic 0 when not driven by one of the plural data nodes. Importantly, it may be seen from FIG. 2 that a datum is supplied over the common time-multiplexed data channel synchronously at the speed of SYSCLK, within a given timeslot.

Another alternative solution, within the spirit and scope of the invention, is to use open-source drivers to pull up the data bus value when driven and a resistive pull-down or an active pre-charge of the bus to a low state.

This basic scheme can be used with wide data buses 32-bit, 64-bit, etc., or with a single wire serial data channel or an optical data channel. In the case of a single wire serial data channel, it is often desirable to have multiple system components that drive a single data channel at different times to enable the packing of distributed data into a single data packet that is to be sent over the data channel. The data channel can be the wired-OR of all of the outputs of the system components driving the data channel. This method allows different system components to drive the data channel on consecutive timeslots without the need for framing bit or blank timeslots between different driving components, as has been done before. Those of skill in the art will appreciate that the timeslots typically are assigned in accordance with a given set of system requirements so that all producers and all consumers of data know which timeslot belongs to which.

The present invention might also be useful in the area of telecommunications where serial data from a variety of different sources are mixed together into a single higher speed serial data channel (refer to the cited British Telecom patent). Normally, all of the data must be selected onto a distributed multiplexing node and then selected onto a single data channel. By allowing a set of system components to mix their data directly on a serial data channel, a less costly solution to the problem would be achieved.

Having illustrated and described the principles of my invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A time-multiplexed data bus driver circuit for use in an emulation or prototyping system, the bus driver circuit comprising:

a plurality of combinatorial circuits, each of said circuits forming a logic combination of a datum value, a datum enable signal and a datum timeslot signal, said plurality of circuits producing a plurality of output signals based thereon, a wired-OR junction producing a logic OR combination of said plurality of output signals representing a time-multiplexed data stream, and an emulator of a target system datum enable logic, wherein the circuit produces the same emulation result in the output signals that the target system datum enable logic would produce.

2. The circuit of claim 1, wherein for each of the combinatorial circuits the enable signal and the timeslot signal are combined in an AND function to produce a gating signal for the datum value, one selected datum value being gated onto the wired-OR junction at a given timeslot when enabled.

3. The circuit of claim 1, wherein the wired-OR junction includes a precharging circuit for actively driving said junction to a positive voltage.

4. The circuit of claim 1, wherein the wired-OR junction includes a precharging circuit for actively driving said junction to a ground voltage.

5. The circuit of claim 1, wherein a plurality of said timeslot enable signals input to a plurality of combinatorial circuits are connected in common.

6. A time-multiplexed data bus driver circuit for use in an emulation or prototyping system, the bus driver circuit comprising:

a plurality of combinatorial circuits, each of said circuits forming a logic combination of a datum value, a datum enable signal and a datum timeslot signal, said plurality of circuits producing a plurality of output signals based thereon, a wired-OR junction producing a logic OR combination of said plurality of output signals representing a time-multiplexed data stream, and arbitration logic coupled with said plurality of combinatorial circuits for selectively enabling only one at a time the plurality of datum enable signals in such manner that only the selected one of the plurality of combinatorial circuits drives the time-multiplexed data bus in any given time slot, said arbitration logic causing each of the non-enabled ones of the plurality of combinatorial circuits to drive its output signal into a defined high-impedance state.

7. The circuit of claim 6, wherein said arbitration logic is synchronized with a system clock signal to assert the selected one of the plural datum enable signals a defined period of time prior to the arrival of the datum timeslot signal.

8. The circuit of claim 7 which further comprises:
timeslot generation logic coupled with said plurality of combinatorial circuits for producing the plurality of datum timeslot signals.

9. The circuit of claim 8 wherein a plurality of said datum timeslot signals input to a plurality of combinatorial circuits are connected in common.

10. The circuit of claim 9 wherein for each of the combinatorial circuits the enable signal, the timeslot signal and the datum signal are combined in an AND function to produce a gating signal for an active-low datum value, one selected active-low datum value being gated onto the wired-OR junction at a given timeslot when enabled.

11. The circuit of claim 10 wherein the wired-OR junction includes a precharge circuit for actively driving said junction to a positive voltage.

12. The circuit of claim 10 wherein the wired-OR junction includes a precharge circuit for actively driving said junction to a ground voltage.

13. A time-multiplexed system comprising:
a plurality of combinatorial circuits, each of said circuits forming a logic combination of a datum value, a datum enable signal and a datum timeslot signal, said plurality of circuits producing a plurality of output signals based thereon;
arbitration logic coupled with said plurality of combinatorial circuits for selectively enabling only one at a time the plurality of datum enable signals in such manner that only the selected one of the plurality of combinatorial circuits drives the time-multiplexed data bus in any given time slot, said arbitration logic causing each of the non-enabled ones of the plurality of combinatorial circuits to drive its output signal into a defined high-impedance state;
timeslot generation logic coupled with said plurality of combinatorial circuits for producing the plurality of datum timeslot signals; and
a wired-OR junction producing a logic OR combination of said plurality of output signals representing a time-multiplexed data stream, said wired-OR junction being biased to a positive voltage,
wherein for each of the combinatorial circuits the enable signal, the timeslot signal and the datum signal are combined in an AND function to produce a gating signal for an active-high datum value, one selected active-high datum value being gated onto the wired-OR junction at a given timeslot when enabled such that said wired-OR junction forms a common time-multiplexed data channel representing in an un-driven state a logic 0.

14. The system of claim 13, wherein a plurality of said datum timeslot signals input to a plurality of combinatorial circuits are connected in common.

15. The system of claim 14, wherein said arbitration logic is synchronized with a system clock to assert the selected one of the plural datum enable signals a defined period of time prior to the arrival of the datum timeslot signal.

16. The system of claim 13 which forms a part of an emulation system wherein said combinatorial circuits, said arbitration logic and said timeslot generation logic are part of a system being emulated and the time-multiplexed data channel is part of an emulator.

17. The system of claim 13 wherein said junction is biased to a positive voltage by a pre-charge circuit including a transistor that actively drives said junction to the positive voltage.

18. The system of claim 17 which forms a part of an emulation system wherein said combinatorial circuits, said arbitration logic and said timeslot generation logic are part of a system being emulated and the time-multiplexed data channel is part of an emulator.

19. The system of claim 17 wherein said junction is biased to a ground voltage by a pre-charge circuit including a transistor that actively drives said junction to the ground voltage.

20. The system of claim 17 wherein said junction is biased to a ground voltage by a pull-down resistor.

21. The system of claim 13 wherein said junction is biased to a positive voltage by a pull-up resistor.

22. A time-multiplexed system comprising:
a plurality of combinatorial circuits, each of said circuits forming a logic combination of a datum value, a datum enable signal and a datum timeslot signal, said plurality of circuits producing a plurality of output signals based thereon;
arbitration logic coupled with said plurality of combinatorial circuits for selectively enabling only one at a time the plurality of datum enable signals in such manner that only the selected one of the plurality of combinatorial circuits drives the time-multiplexed data bus in any given time slot, said arbitration logic causing each of the non-enabled ones of the plurality of combinatorial circuits to drive its output signal into a defined high-impedance state;
timeslot generation logic coupled with said plurality of combinatorial circuits for producing the plurality of datum timeslot signals; and
a wired-AND junction producing a logic AND combination of said plurality of output signals representing a time-multiplexed data stream, said wired-AND junction being biased to a ground voltage,
wherein for each of the combinatorial circuits the enable signal, the timeslot signal and the datum signal are combined in an AND function to produce a gating signal for an active-low datum value, one selected active-low datum value being gated onto the wired-OR junction at a given timeslot when enabled such that said wired-AND junction forms a common time-multiplexed data channel representing in an un-driven state a logic 1.

23. The system of claim 22, wherein a plurality of said datum timeslot signals input to a plurality of combinatorial circuits are connected in common.

24. The system of claim 23, wherein said arbitration logic is synchronized with a system clock to assert the selected one of the plural datum enable signals a defined period of time prior to the arrival of the datum timeslot signal.

* * * * *